US010742659B1

(12) United States Patent
Roka et al.

(10) Patent No.: US 10,742,659 B1
(45) Date of Patent: Aug. 11, 2020

(54) RESTRICTED CONTENT ACCESS PROVISION BASED ON THIRD-PARTY VERIFICATION

(71) Applicant: Cox Communications, Inc., Atlanta, GA (US)

(72) Inventors: Pujan Roka, Alpharetta, GA (US); Yousef Wasef Nijim, Cumming, GA (US); Douglas David Gravino, Roswell, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 140 days.

(21) Appl. No.: 15/979,503

(22) Filed: May 15, 2018

(51) Int. Cl.
*H04L 29/06* (2006.01)

(52) U.S. Cl.
CPC ........ *H04L 63/102* (2013.01); *H04L 63/0884* (2013.01); *H04L 63/20* (2013.01); *H04L 63/083* (2013.01)

(58) Field of Classification Search
CPC ... H04L 63/102; H04L 63/0884; H04L 63/20; H04L 63/083
See application file for complete search history.

(56) References Cited

U.S. PATENT DOCUMENTS

| | | | | |
|---|---|---|---|---|
| 6,564,253 B1 * | 5/2003 | Stebbings | ............... | G06Q 20/40 380/201 |
| 8,881,302 B1 * | 11/2014 | Ace | ......................... | G06F 21/10 455/557 |
| 8,898,751 B2 * | 11/2014 | Yin | ......................... | G06F 21/42 455/410 |
| 9,363,256 B2 * | 6/2016 | Caldwell | ................. | H04L 63/08 |
| 2004/0006627 A1 * | 1/2004 | Sarfaty | ................. | G06F 3/0481 709/228 |
| 2007/0169144 A1 * | 7/2007 | Chen | ................... | H04N 7/17318 725/30 |
| 2008/0147674 A1 * | 6/2008 | Nandiwada | ........... | H04L 51/066 |
| 2009/0089180 A1 * | 4/2009 | Cho | .................... | G06Q 20/0855 705/26.1 |

(Continued)

OTHER PUBLICATIONS

"XFINITY on Campus", penn.video.network, webpage archived on Nov. 27, 2016, 15 pages (Year: 2016).*

*Primary Examiner* — Michael Pyzocha
(74) *Attorney, Agent, or Firm* — Merchant & Gould

(57) ABSTRACT

Access to a provider's restricted resources for users who are not directly associated with the provider but who are permitted to access the restricted resources based on the users' affiliation with a third-party subscriber is provided. An example affiliation is a university student's (user's) affiliation with a university (third-party subscriber). A user's identity can be authenticated by the third party, and the user's access entitlements can be authorized by the third party based on the third party's authorization policies and by an authorized distributor of the restricted resources of which the third party is a subscriber based on the distributor's authorization policies. An access decision is made by a policy enforcement service based on the authorization access decisions made by the third party and by the authorized distributor. The provider allows the user access to its otherwise restricted resources based on a permit decision made by the policy enforcement service.

20 Claims, 8 Drawing Sheets

(56) References Cited

U.S. PATENT DOCUMENTS

| | | | |
|---|---|---|---|
| 2009/0313665 A1* | 12/2009 | Rouse | H04N 7/1675 725/93 |
| 2010/0100925 A1* | 4/2010 | Hinton | G06F 21/10 726/1 |
| 2011/0283333 A1* | 11/2011 | Ukkadam | H04L 63/102 725/131 |
| 2012/0210340 A1* | 8/2012 | Reynolds | H04N 21/2543 725/23 |
| 2012/0290436 A1* | 11/2012 | Frost | G06O 30/06 705/26.41 |
| 2012/0323717 A1* | 12/2012 | Kirsch | G06Q 20/0855 705/26.1 |
| 2013/0198787 A1* | 8/2013 | Perry, II | H04N 21/25816 725/86 |
| 2014/0075188 A1* | 3/2014 | Yin | H04L 63/0807 713/168 |
| 2015/0381606 A1* | 12/2015 | Srivastav | H04L 63/0823 726/4 |
| 2016/0381080 A1* | 12/2016 | Reddem | H04L 63/205 726/1 |
| 2018/0027263 A1* | 1/2018 | Martin | H04N 21/44016 725/32 |
| 2019/0050551 A1* | 2/2019 | Goldman-Kirst | G06F 21/335 |

* cited by examiner

RESTRICTED CONTENT ACCESS PROVISION BASED ON THIRD-PARTY VERIFICATION

BACKGROUND

Being able to verify the identity of an unregistered user and to determine the unregistered user's permissions to access restricted resources are technical problems that exist when providing restricted resource-access to the unregistered user (e.g., a non-subscriber) on a registered subscriber's network of which the unregistered user is affiliated. For example, a university or other enterprise may be both a subscriber of a particular resource provider that is a provider of restricted resources (e.g., media content) and a subscriber of a particular authorized resource distributor of the provider's restricted resources. Further, a plurality of users who are affiliated with the enterprise may be permitted to access the restricted resource content based on the users' affiliation with the enterprise; however, the affiliated users may not be established as registered users with the restricted resource provider.

The restricted resource provider, in its role as a content provider, controls access to its restricted resources and therefore, will want to authenticate the user and authorize the user's access; however, since the user is not a registered user or subscriber of the restricted resource provider nor of the distributor of the restricted resources (which can be a single entity), the restricted resource provider is not able to verify the user's identity nor enforce any access restrictions that the user's access may be contingent upon (e.g., access restrictions that the enterprise with which the user is affiliated may want to enforce based on various policies associated with providing or brokering the access to the restricted resources that the enterprise is permitted based on its subscription with the restricted resource provider and distributor).

While current authentication and authorization processes enable the restricted resource provider to verify identities of its registered users and to determine the registered users' permissions to access the restricted resources that it offers, current authentication and authorization processes do not provide for authenticating and authorizing a subscriber-affiliated user's access to restricted resources when the user is not a registered subscriber of the restricted resource provider. Current authentication and authorization processes may enable the restricted resource provider to verify the identity of the user with another entity (the enterprise) if the user shares his/her credentials with the restricted resource provider; however, sharing the credentials is a security threat that the user, the entity, nor the resource provider may be willing to risk.

With the continually emerging threat of unauthorized access, hacking, and/or other fraudulent use or access of provider services and resources, a technical solution is needed to enable authentication and authorization of an unregistered user based on the user's affiliation with a subscriber.

SUMMARY

Aspects of the present disclosure provide a system, method, and computer readable storage device for authenticating a user and for authorizing the user's access to restricted resources, wherein the user is not directly associated with a provider or distributor of the restricted resources but is authorized to access the restricted resources based on the user's relationship or affiliation with a third-party subscriber. Aspects provide an improvement to access control of restricted resources by providing an ability to provide otherwise restricted resources based on the third party's verification of the user's identity on the third party's network and based on the third party's authorization policies.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
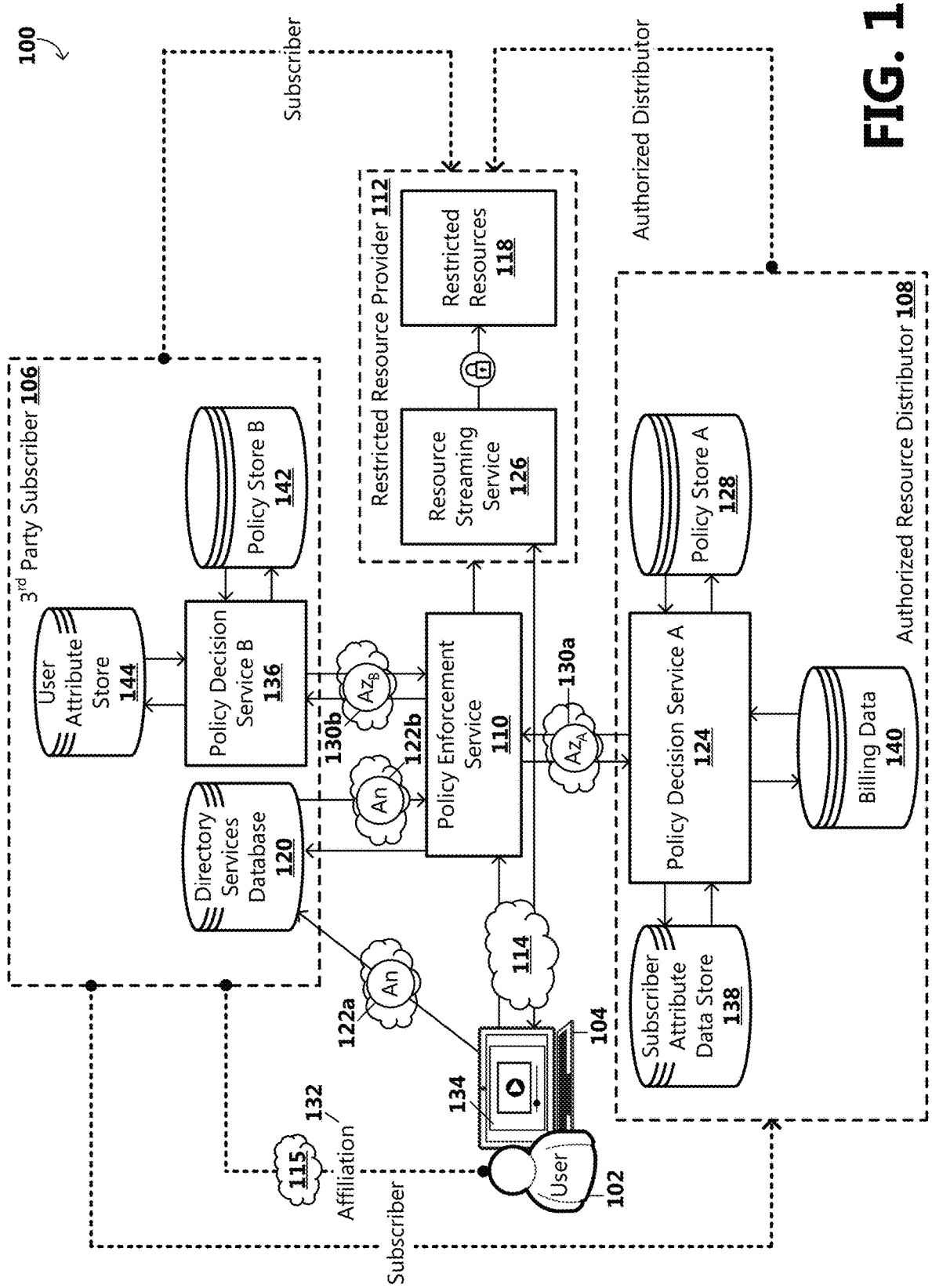
FIG. 1 is a block diagram of an example environment in which a system of the present disclosure can be implemented.

Aspects of the present disclosure enable authenticating a user and for authorizing the user's access to restricted resources, wherein the user is not directly associated with a provider or distributor of the restricted resources but is authorized to access the restricted resources based on the user's relationship or affiliation with a third party subscriber. Aspects provide for protecting the provider's and distributor's rights for preventing theft of service using appropriate measures for user authentication and fraud prevention, while providing an appropriate level of security. FIG. 1 is a block diagram of an example environment 100 in which a system can be implemented for authenticating a user 102 and for authorizing the user's access to restricted resources 118, wherein the user is not directly associated with a provider 112 or distributor 108 of the restricted resources but is authorized to access the restricted resources based on the user's relationship or affiliation 132 with a third-party subscriber 106. As shown in FIG. 1, the example environment 100 includes a restricted resource provider 112, a client device 104, a third-party subscriber 106, an authorized resource distributor 108, a resource streaming service 126, and a policy enforcement service 110. Each component in the example environment 100 includes one or more computing devices such as servers, workstations, desktop computers, laptop computers, tablets, mobile phones, smart devices, etc., and one or more databases. Further details of the computing devices and variations thereof can be found in FIGS. 6, 7A, 7B, and 8.

According to an aspect, the third-party subscriber 106 is illustrative of an entity, such as an enterprise, with which the user 102 has an affiliation 132, wherein the third party has a direct association (e.g., subscription, user registration) with the restricted resource provider 112 and additionally with the authorized resource distributor 108 (e.g., the third party is a subscriber of the restricted resource provider and has a subscriber account with the authorized resource distributor). In various implementations, the restricted resource provider 112 and the authorized resource distributor 108 are the same entity. For example, the restricted resource provider 112 may distribute its own resources directly to its subscribers. According to an aspect, the user 102 may not have a direct association (e.g., subscription) with the restricted resource provider 112 nor with the authorized resource distributor 108; however, based on the user's affiliation 132 with the third-party subscriber 106 and based on the third party subscriber's subscription with the restricted resource provider and the authorized resource distributor, the user 102 is entitled to access resources distributed by the authorized resource distributor and to the restricted resources 118 provided by the restricted resource provider. As used herein, the term "restricted resource" 118 is used to describe content items (e.g., documents, software, graphics, photos, videos, devices, games) that have one or more restrictions (access control information) associated with them that require a user, device, or application to have certain access rights or privileges to access the items. When an entity (e.g., user, device, or application) requests permission to access a restricted resource 118, an authentication process confirms the requesting entity's asserted identity, and an authorization process evaluates access control information associated with the resource for determining whether the entity is allowed access to the resource.

As used herein, the term "affiliation" 132 is used to describe a public or contractual relationship between the third-party subscriber 106 and the user 102, and wherein the relationship is recognized by the restricted resource provider 112 and the authorized resource distributor 108 as a valid affiliation. Example affiliations 132 may include a relationship between a school/university and a student or faculty member, a relationship between an employer and an employee, a relationship between a landlord and a tenant, a relationship between a municipality and a member/occupant of the municipality, and the like. According to an aspect, a user 102 affiliated with the third-party subscriber 106 has a user account with the third party that enables the user access to particular resources, such as restricted resources 118, on the third party's enterprise network 115 that are provided by the authorized resource distributor 108. For example, the third-party subscriber 106 can be embodied as an enterprise, such as a university, that subscribes to media programming services (and, in some implementations, other services) from the authorized resource distributor 108 and to restricted resources 118 provided by the restricted resource provider 112, and the user 102 may be a student of the university (third-party subscriber 106).

In various implementations, the authorized resource distributor 108 is illustrative of a provider of media programming services, video on demand services, and, in some implementations, other services, such as Internet access and voice services. According to an aspect, the authorized resource distributor 108 is an authorized distributor of restricted resources 118 provided by the restricted resource provider 112. For example, the authorized resource distributor 108 can be embodied as a multichannel video programming distributor (MVPD) (e.g., cable operator, direct-broadcast satellite provider, wireline video provider) that delivers multiple channels of video programming to subscribers, typically for a subscription fee. As mentioned above, the authorized resource distributor 108 and the restricted resource provider 112 can be the same entity.

Figure 8:
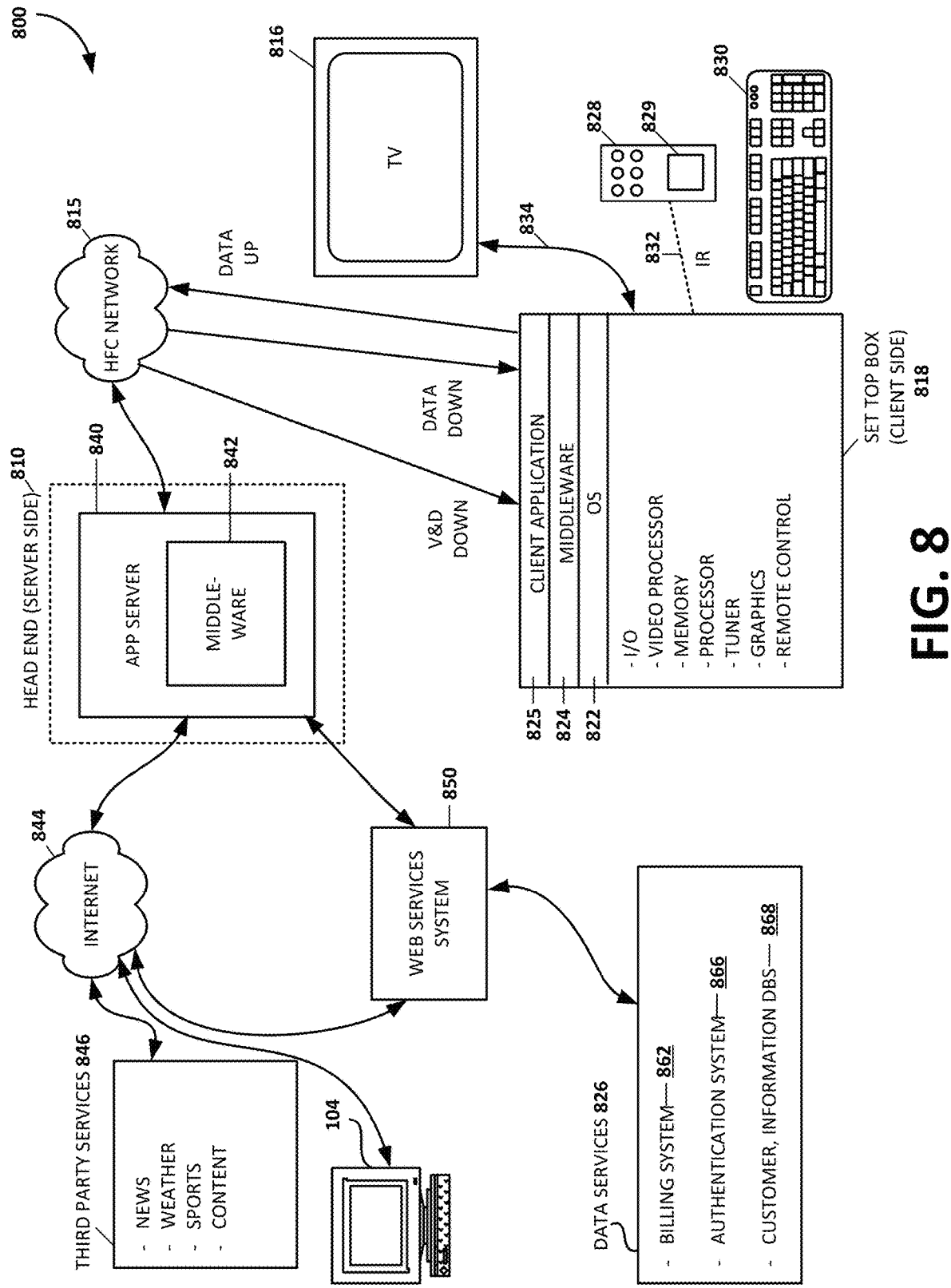
FIG. 8 is a block diagram illustrating components of a cable services system architecture providing an example operating environment according to aspects of the present disclosure.

As used herein, the term "subscriber" embodies a person, household, or enterprise that legally receives and pays for media programming services distributed by the authorized resource distributor 108 and for restricted resources 118 distributed by the restricted resource provider 112. For example, the restricted resource provider 112 is illustrative of an entity that provides or distributes restricted resources 118, such as media content, for transmission to subscribers. In some examples, the restricted resource provider 112 distributes restricted resources 118 to the authorized resource distributor 108 for retransmission by the authorized resource distributor to subscribers. For example, the authorized resource distributor 108 may retransmit restricted resources 118 provided by the restricted resource provider 112 via a network 115 (e.g., a cable television (CATV) system, a satellite television system, a wireless cellular network connection, an Internet or intranet network connection) provided by the authorized resource distributor. An example CATV architecture that can serve as one example of an authorized resource distributor 108 system is illustrated in FIG. 8 and is described below.

In some examples, the restricted resource provider 112 may enable its subscribers access to entitled (restricted) resources 118 online at the restricted resource provider's website. For example, the restricted resource provider 112 may act as a content provider that distributes restricted resources 118 directly to subscribers, such as via a resource streaming service 126 provided by the restricted resource provider. In various examples, the resource streaming service 126 is a web-based streaming service that is operative or configured to deliver a stream of a restricted resource 118 from the restricted resource provider 112 to an end user over a network 114 or a combination of networks. An illustrative example of a restricted resource provider 112 is HBO® (HOME BOX OFFICE, Inc.), and an illustrative example of a resource streaming service 126 provided by the resource provider is HBO GO®. In some examples, the restricted resource provider 112 uses the authorized resource distributor 108 to provide restricted resources 118 to end users through the authorized resource distributor's network (e.g., stream content to end users using its own servers) when the end user is connected to the Internet through the resource distributor's network. The network 114 or networks can be wired or wireless, and can encompass a variety of network types including, but not limited to, the Internet, an intranet, an extranet, local-area networks, wide-area networks, fiber-coax networks, public switched telephone networks, global telephone networks, etc., and combinations thereof. In some implementations, the third-party subscriber 106 comprises an enterprise network 115 that includes a proprietary local-area network (LAN) or a set of interconnected LANs that serves the third party. In some examples, restricted resources 118 may be distributed to subscribers by a communication network 114 (e.g., CATV, satellite, Internet, cellular) and enterprise network 115 provided by the authorized resource distributor 108.

According to an aspect, a user agent 134 executing on the user's client device 104 is operative or configured to communicate with the resource streaming service 126, wherein the user agent provides an interface and functionality for enabling the user 102 to view, preview, select, stream, and access restricted resources 118 (e.g., video, audio, graphics, photos, games, text), special features, account information, and/or messages provided by the restricted resource provider 112. In some examples, the user agent 134 is a web browser application. In other examples, the user agent 134 is an application, such as a streaming application provided by the restricted resource provider 112 that is downloaded onto the user's client device 104 or an application that is integrated with the client device that is operative to access content provided by the restricted resource provider 112. For example, an illustrative example of the user agent 134 embodied as an application downloaded onto the user's client device 104 is the HBO GO® application that is operative to communicate with the resource streaming service 126 over a network 114 or combination of networks.

According to an aspect, prior to provided restricted resources 118 to an end user, the restricted resource provider 112 employs a policy enforcement service 110 to authenticate the user 102 and to determine whether the user is authorized to access the provider's restricted resources 118. In some examples, the policy enforcement service 110 is embodied as an authentication and authorization system. The policy enforcement service 110 is illustrative of a service through which a request for access to restricted resources 118 distributed by the restricted resource provider 112 is directed for verifying the identity of the requesting user 102 or device (client device 104) and for granting the user or device specified access to restricted resources 118 based on access control information. In some implementations, the policy enforcement service 110 is implemented by an intermediary system that mediates authentication and authorization transactions between the user client device 104, the restricted resource provider 112, the third-party subscriber 106, and the authorized resource distributor 108.

In some examples, the user agent 134 provides a user interface for enabling the user 102 to select to log into the restricted resource provider's resource streaming service 126. In some examples, the user interface includes an input field for enabling the user 102 to select a particular provider from a list of authorized distributors of the restricted resource provider's restricted resources 118. According to an aspect, the third-party subscriber 106 with which the user 102 is affiliated is recognized by the restricted resource provider 112 as an authorized distributor, provider, or broker of the restricted resource provider's restricted resources 118. According to an aspect, when a selection is made of the third-party subscriber 106 with which the user 102 is affiliated, a login request is initiated, and the user agent 134 is operative to communicate this login request and selection to the resource streaming service 126. Based on the user's selection of the third-party subscriber 106, the resource streaming service 126 is operative to forward the login request and selection to the policy enforcement service 110 to mediate authentication and authorization processes.

In some implementations, in an authentication process, the policy enforcement service 110 makes a call to an authentication provider associated with the third-party subscriber 106 to link the user to the user's electronic identity in the third party's system. For example, responsive to receiving a request from a user affiliated with the third-party subscriber 106 for access to restricted resources 118 distributed by the restricted resource provider 112, the policy enforcement service 110 is operative or configured to make a call to the third-party subscriber 106 for authenticating the requesting user 102 based on access control policy information. In some examples, the policy enforcement service 110 has access to access control policy information associated with an access control request from a user affiliated with the third-party subscriber 106 for access to restricted resources 118 provided by the restricted resource provider 112. The access control policy information can define the relationship between the third-party subscriber 106, the authorized resource distributor 108, and the restricted resource provider 112, and can provide information to the policy enforcement service 110 regarding where to direct authentication and authorization requests associated with the access control request. This access control policy information can be stored in a policy store (policy store A 128) maintained and provided by the authorized resource distributor 108, stored at and provided by the restricted resource provider 112, or can be provided by the authorized resource distributor or the restricted resource provider and stored by the policy enforcement service 110. In some examples, the policy enforcement service 110 directs the user agent 134 to open a login webpage for the authentication provider (e.g., the third-party subscriber 106) by providing a URL for a login page for the third-party subscriber 106 where a user interface can be provided by the third-party subscriber for enabling the user to enter his/her credentials for the third-party subscriber.

According to an aspect, after the user 102 inputs his/her third-party credentials, a request is made to the third-party subscriber 106, wherein the request includes the authentication credentials (e.g., username or email address and password credentials) input by the user 102 and an attribute that indicates that the request is associated with a third-party-affiliated user (i.e., a user 102 who is not directly associated with the restricted resource provider 112 but who is affiliated with a third-party subscriber 106 that is directly associated with the restricted resource provider). For example, the attribute indicating the request's association with the third-party-affiliated user can be based on the user-selection of the third-party subscriber 106 when prompted to select a service provider from a list, can be based on a domain name included in the user's authentication credentials (e.g., third party's domain name in the user's email address), or can be based on another attribute about the user, the resource, or the environment (context of the request).

In some examples, the policy enforcement service can include various URL parameters that tells the third-party subscriber 106 who the resource streaming service 126 is and what the resource streaming service needs for the third-party subscriber to do (e.g., a client ID associated with the resource streaming service, a type of response that the resource streaming service wants back (e.g., a token, an access code). Other parameters may also be included. In some examples, a user interface for enabling the user to enter his/her credentials can be provided to the user 102 via the user agent 134 via an embedded web view, a frame, an iframe, or in a separate window. The authentication credentials may take the form of a username and a machine-readable cryptographic key and/or password that establishes the identity of the user 102. The authentication credentials may be self-issued, issued by the third-party subscriber 106, or issued by the policy enforcement service 110. Although a username and password are described herein as the authentication credentials input into by the user 102, other factors can be used for authentication, such as smart cards or a security token device, biometric methods (e.g., fingerprint, retinal or iris scan, voice analysis), etc. In various implementations, the authentication credentials used by the user 102 to log into the resource streaming service 126 to access restricted resources 118 provided by the restricted resource provider 112 are the login credentials the user 102 uses for accessing an account, online services, or other enterprise network 115 resource associated with the third-party subscriber 106 (e.g., a university student using student login credentials associated with the student's university account, wherein the university is the third party and the student is the user).

In various implementations, the authentication credentials entered by the affiliated user 102 are transmitted to an appropriate authentication provider illustrative of a directory or database that contains the user's credentials and can confirm the user submitted them correctly. According to an implementation, the authentication provider is embodied as a directory services database 120 maintained by the third-party subscriber 106 with which the user 102 is affiliated, wherein the third party is a registered subscriber of the restricted resource provider 112 based on the third party's subscription with the authorized resource distributor 108. According to an example, the directory services database 120 is illustrative of a software application, module, or computing device operative or configured to store and manage usernames and passwords (authentication credentials) for principals (i.e., entities whose identity can be authenticated). In some examples, the directory services database 120 is an LDAP (Lightweight Directory Application Protocol) server that is configured to allow various applications and services to connect to it to access and maintain distributed directory information services over an Internet Protocol (IP) network 114.

According to an aspect, the policy enforcement service 110 is operative or configured to make a call to the directory services database 120 to authenticate the user 102, wherein in an authentication transaction 122, account credentials and other information that assert the user's identity are provided in a first transaction 122a between the user agent 134 and the directory services database 120 to determine whether the user has supplied the correct information to prove that he/she is associated with a specific electronic identity in the third party's system. In some implementations, authentication against the directory services database 120 can include the following processes: DN (distinguished name) resolution, password validation, and entry resolution. For example, in the call made to the directory services database 120, the policy enforcement service 110 includes an identifier of the account to authenticate and prove of the user's identity. Oftentimes, the identifier of the affiliated user's account with the subscriber 106 is not the DN, but is a username or an email address that matches an attribute on the user's directory services database entry. The directory services database 120 can resolve the DN of the entry by using the identifier input by the user 102 to run a search against the username or email attributes of user entries to find the matching entry DN. When the DN of the user 102 is resolved, the password can be validated. For example, the password can be checked using an LDAP bind command, wherein using the entry DN, the password is checked against a password attribute in the user's entry in the electronic identity data stored at the directory services database 120.

If the user 102 is successfully authenticated, the directory services database 120 is operative to return a success or pass result in a second authentication transaction 122b to the policy enforcement service 110. In some examples, a successful authentication response is in the form of a token that contains claims, that the authentication provider (e.g., third-party directory services database 120) has authenticated the user 102. In some examples, the When the user 102 is not successfully authenticated, an invalid credentials or other failure result is returned to the policy enforcement service 110.

After the user's identity is validated, the policy enforcement service 110 is further operative or configured to execute authorization transactions 130a,b for determining whether the user 102 is authorized to access the restricted resource provider's restricted resources 118 based on one or more authorization policies. In some implementations, the policy enforcement service 110 is operative or configured to execute an authorization process at user login for determining whether the user 102 is entitled to access the resource streaming service 126. According to an aspect, authentication state persistence data that indicates when an authenticated user's authentication state should be persisted or cleared can be included in the authentication response provided by the third-party directory services database 120. The authentication state persistence data can include authentication state persistence instructions specified by the third-party subscriber 106, the restricted resource provider 112, or the authorized resource distributor 108. For example, the authentication state persistence data can indicate whether a signed in user should be indefinitely persisted until explicit sign out, cleared when a window or application is closed, cleared on page reload, cleared after a specified time limit (e.g., 6 months, date of the end of the semester), etc. In some examples, authentication state persistence is based on the client device 104 the user is using to access restricted resources 118.

In some implementations, the policy enforcement service 110 is operative or configured to execute an authorization process at user login for determining what restricted resources 118 the user 102 is eligible to access. For example, this determination can be used to present to the user 102 only the restricted resources 118 that are eligible to the user. In some implementations, the policy enforcement service 110 is operative or configured to make an explicit authorization access request for an allow/deny decision on a specific restricted resource 118 item (e.g., responsive to a user request to access the particular restricted resource item). In some implementations, the policy enforcement service 110 is operative or configured to execute an authorization process at login, wherein attribute information associated with one or more authorization policies are provided to the policy enforcement service for enabling the policy enforcement service to make determinations about the user's permission to use the resource streaming service 126 and/or to make determinations about the user's permission to access particular restricted resources 118 based on one or more authorization policies.

According to some examples, the one or more authorization policies provide parameters of the user's authorized access to the restricted resources 118 (e.g., what content the user 102 can access, when the user can access the content, where the user can access the content). According to an aspect, the policy enforcement service 110 is operative or configured to send authorization (access) requests to one or more policy decision points: a policy decision service A 124 associated with the authorized resource distributor 108 and a policy decision service B 136 associated with the third-party subscriber 106. The policy decision services are illustrative of entities that accept authorization requests, evaluate policies, and respond with authorization decisions. In some examples, the policy decision services can additionally or alternatively provide attribute information (e.g., user-related attributes, third-party-related attributes) for enabling the policy enforcement service 110 to make allow and deny decisions with respect the user requests to access restricted resources 118. Although two policy decision services 124, 136 are illustrated in FIG. 1, in other implementations, additional policy decision services can be used for providing additional authorization access decisions.

The authorization access requests are requests for determining whether the user's request for access to the restricted resource provider's restricted resources 118 is approved or rejected based on one or more rules defined in the one or more authorization policies with which the policy decision services 124,136 are configured. For example, the policies can provide a plan of action which guides authorization decisions for achieving logical outcomes. The one or more authorization policies can enable the authorized resource distributor 108 and the third-party subscriber 106 to control, for example, who can access restricted resources 118, the restricted resources that can be accessed, and when, where, and how the restricted resources are accessed. Policies can specify attributes or rule parameters about one or more of the user 102, the restricted resources 118, and the environment (context of the request).

According to an implementation, in a first authorization transaction 130a, the policy enforcement service 110 makes an authorization access request directed to a first policy decision point (policy decision service A 124) for making an allow or deny decision on the user's login request based on attributes associated with the third-party subscriber 106. As should be appreciated, although the term "first" is used in describing the first authorization transaction 130a, the term "first" is not meant to limit the order in which the authorization access requests are sent, only to emphasize an authorization access request of a plurality of authorization access requests made to a plurality of policy decision points. The first authorization transaction 130a can be sent prior to, simultaneous to, or after sending a later-described second authorization request transaction 130b directed to the third-party subscriber 106 with which the user 102 is affiliated.

In various implementations, policy decision service A 124 is embodied as an identity management server associated with the authorized resource distributor 108. Policy decision service A 124 is operative or configured to check the policies associated with the authorized resource distributor's requirements for enabling users affiliated with the third party to access restricted resources 118 provided by the restricted resource provider 112. The policies associated with the authorized resource distributor's requirements for enabling users affiliated with the third party access to restricted resources 118 are stored in a policy store: policy store A 128.

According to an example, the authorized resource distributor 108 may have an authorization policy that indicates that the third-party subscriber 106 with which the user 102 is associated must be an authorized provider of the restricted resource provider's restricted resources 118 on the third party's campus (e.g., is authorized to have affiliated users who are eligible to access the restricted resources based on the users' affiliation with the third party). Attribute information that can be evaluated by policy decision service A 124 to determine whether a rule defined in the policy is satisfied. According to an aspect, a policy information point is used to store such attributes. In various implementations, a policy information point that is used to store third-party-related attributes is embodied as a subscriber attribute data store 138 illustrative of a database or user registry. For example, attributes associated with the third party's business relationship agreement with the authorized resource distributor 108 are stored in the subscriber attribute data store 138 that acts as a policy information point. When a policy uses attributes, policy decision point A 124 is operative or configured to make a query to the subscriber attribute data store 138 to evaluate the attributes, and the policy information point is operative or configured to provide information about the attributes queried.

According to examples, the authorized resource distributor 108 may have additional authorization policies related to requirements for enabling users affiliated with the third party access to restricted resources 118. For example, another authorization policy can indicate that the third-party subscriber 106 with which the user 102 is associated must have an active account with the authorized resource distributor 108 that is in good standing. In this example, attribute information associated with the third party's business account status is stored in a policy information point embodied as a billing data store 140. Other authorization policies and policy information points can be implemented by the authorized resource distributor 108 for evaluating attributes against the authorized resource distributor's requirements for enabling users affiliated with the third party to access restricted resources 118 provided by the restricted resource provider 112.

According to an aspect, policy decision point A 124 is operative to reach a pass or deny decision based on an evaluation of various attribute information against rules defined in the policies and to return this decision to the policy enforcement service 110 in an authorization access response. As an example, if a policy indicates that the third-party subscriber 106 is an authorized subscriber to services provided by the authorized resource distributor 108 and to restricted resources 118 provided by the restricted resource provider 112 and is an authorized provider of services to affiliated users, policy decision service A 124 can respond to the policy enforcement service 110 with a pass response; otherwise, policy decision service A 124 can respond to the policy enforcement service 110 with a fail response.

According to an aspect, an authorization policy can be comprised of one or more requirements, wherein an authorization access decision is based on satisfaction of a plurality of rules, which can include "and" expressions and/or "or" expressions. For example, rules within an "and" expression must all evaluate as true for the overall policy to evaluate true, while any rule within an "or" expression can be evaluated as true for the overall policy to evaluate true. For example, a policy may indicate that restricted resource access is enabled for a user affiliated with the third-party subscriber 106 if the third party is an authorized subscriber to services provided by the authorized resource distributor 108 "and" is an authorized subscriber to restricted resources 118 provided by the restricted resource provider 112, that the third party is an authorized provider of services to affiliated users, "and" that the third party's account status is active and in good standing. Accordingly, if one rule in the policy is not satisfied (e.g., the third party's account with the authorized resource distributor 108 is inactive, expired, or delinquent), policy decision point A 124 can make a deny access decision and return the decision it to the policy enforcement service 110. In some examples, the authorization access response includes attribute information associated with one or more authorization policies such that the policy enforcement service can make determinations about the user's permission to use the resource streaming service 126 and/or to make determinations about the user's permission to access particular restricted resources 118.

According to an implementation, in a second authorization transaction 130b, the policy enforcement service 110 makes an authorization access request directed to a second policy decision point (policy decision service B 136) for making an allow or deny decision on the user's login request based on an evaluation of attributes associated with the user 102 based on one or more third-party-related authorization policies that define the user's authorized access to the restricted resources 118 (e.g., what content the user 112 can access, when the user can access the content, where the user can access the content, how the user can access the content).

In various implementations, policy decision service B 136 is embodied as an account administrative server associated with the third-party subscriber 106. Policy decision service B 136 is operative or configured to check the policies associated with the third party's requirements for enabling users affiliated with the third party to access restricted resources 118 provided by the restricted resource provider 112. The policies associated with the third party's requirements for enabling users affiliated with the third party access to restricted resources 118 are stored in a policy store: policy store B 142.

Third-party authorization policies that may be stored in the policy store (policy store B 142) and evaluated by policy decision service B 136 against certain attributes can include policies associated with the user's student status (e.g., students with an active status are enabled access), housing status (e.g., on-campus housing students are enabled access), network status (e.g., students using an on-campus (enterprise) network 115 are enabled access, students connected to the Internet via the authorized resource distributor's network are enabled access), GPA status (e.g., students having at least a predetermined minimum GPA are enabled a certain level/type of access), student category (e.g., students of a predetermined year/grade or students that are categorized as an undergraduate or graduate are enabled a certain level/type of access), location status (e.g., students that are on-campus are enabled access), date (e.g., certain levels/types of access are enabled during certain days of the week, certain dates), time (e.g., certain levels/types of access are enabled during certain times of the day), etc. As described above, a policy can include a plurality of rules, wherein rules within an "and" expression must all evaluate as true for the overall policy to evaluate true, while any rule within an "or" expression can be evaluated as true for the overall policy to evaluate true. In some examples, rule set expressions can be combined within other rule set expressions to create complex expressions. In some examples, rules can include IF/THEN statements about a user, resource, action, and/or the environment. As an example: IF the user is an on-campus housing student AND is on a campus network (e.g., enterprise network 115) AND if a time attribute associated with the request is between the hours of 5:00 AM and 12:00 AM, THEN allow access. Other authorization policies and combinations are possible and are within the scope of the present disclosure.

According to an aspect, attribute information that is evaluated by policy decision service B 136 to determine whether a rule defined in the policy is satisfied can be stored at a policy information point, such as a user attribute store 144 illustrative of a database or user registry. For example, attributes associated with the user 102 in relation to the user's affiliation with the third-party subscriber 106 are stored in the user attribute store 144 that acts as a policy information point. When a policy uses attributes, policy decision service B 136 is operative or configured to make a query to a policy information point (e.g., user attribute store 144) for attribute information, and the result of the attribute query is returned to the policy decision service.

In some implementations, attribute information that is evaluated by policy decision service B 136 to determine whether a rule defined in the policy is satisfied is provided in the authorization access request. For example, this attribute information can include relevant context information, such as location information, connected network information, etc., sensed by one or more sensors integrated with or communicatively attached to the affiliated user's client device 104 and communicated to policy decision service B 136 in the access request sent by the policy enforcement service 110. In some examples, policy decision service B 136 is configured to request relevant context attribute information from the user's client device 104 (e.g., via a request call made to the client device via the user agent 134. The relevant context information can be evaluated by policy decision service B 136 against the rules defined in the policies for determining whether the user 102 is authorized to access the restricted resources 118.

Policy decision service B 136 is operative to complete its evaluation and return an allow/deny response to the policy enforcement service 110. Based on the authentication decision and the authorization decisions, the policy enforcement service 110 is operative to either permit or deny user access to the restricted resources 118. For example, based on the authentication response from the third-party subscriber 106 and the first and second authorization responses from the authorized resource distributor 108 and the third-party subscriber 106, the policy enforcement service 110 responds to the resource streaming service 126 with results of the login request and, in some examples, authorization attributes. In various implementations, the policy enforcement service 110 is operative to make a permit authorization access decision when the authorization responses from both the third-party subscriber 106 and from the authorized resource distributor 108 indicate that the user is authorized to access the restricted resources 118. In some examples, the authorization access response from the third-party subscriber 106 includes attribute information associated with one or more authorization policies such that the policy enforcement service 110 can make a determination about the user's permission to use the resource streaming service 126 and/or to make a determination about the user's permission to access particular restricted resources 118.

A passing login result can be in the form of a token or user credential. In some examples, the policy enforcement service 110 is further operative to set an expiration date for the user credential and cache the user credential until the expiration date for allowing access until the allowance is expired, revoked, or surrendered. The resource streaming service 126 is operative or configured to receive the login results and authorization attributes. In some examples, the resource streaming service 126 maintains the user credential for a duration until at least the expiration date. In some examples, the user 102 may be mandated by the third-party subscriber 106 and/or the authorized resource distributor 108 to install a security certificate on the client device 104 before the user is enabled access to the streaming service 126 or to the restricted resources 118.

When the user 102 is authorized to access restricted resources 118 as indicated by the authentication and authorization decisions, the resource streaming service 126 is operative to provide the user access to the restricted resources via the user agent 134. The user 102 may select a particular restricted resource 118 item to stream. Based on whether the user is authorized to view the selected media content item (based on the user's authorization attributes), the content source streaming service 126 streams the selected restricted resource 118 item to the user agent 134. In some examples, such as when the user 102 is connected to the Internet via the authorized resource distributor's network, the policy enforcement service 110 or the resource streaming service 126 can send a request to the authorized resource distributor 108 to stream a restricted resource 118 to the user client device 104 from the authorized resource distributor 108's network/servers.

Figure 2:
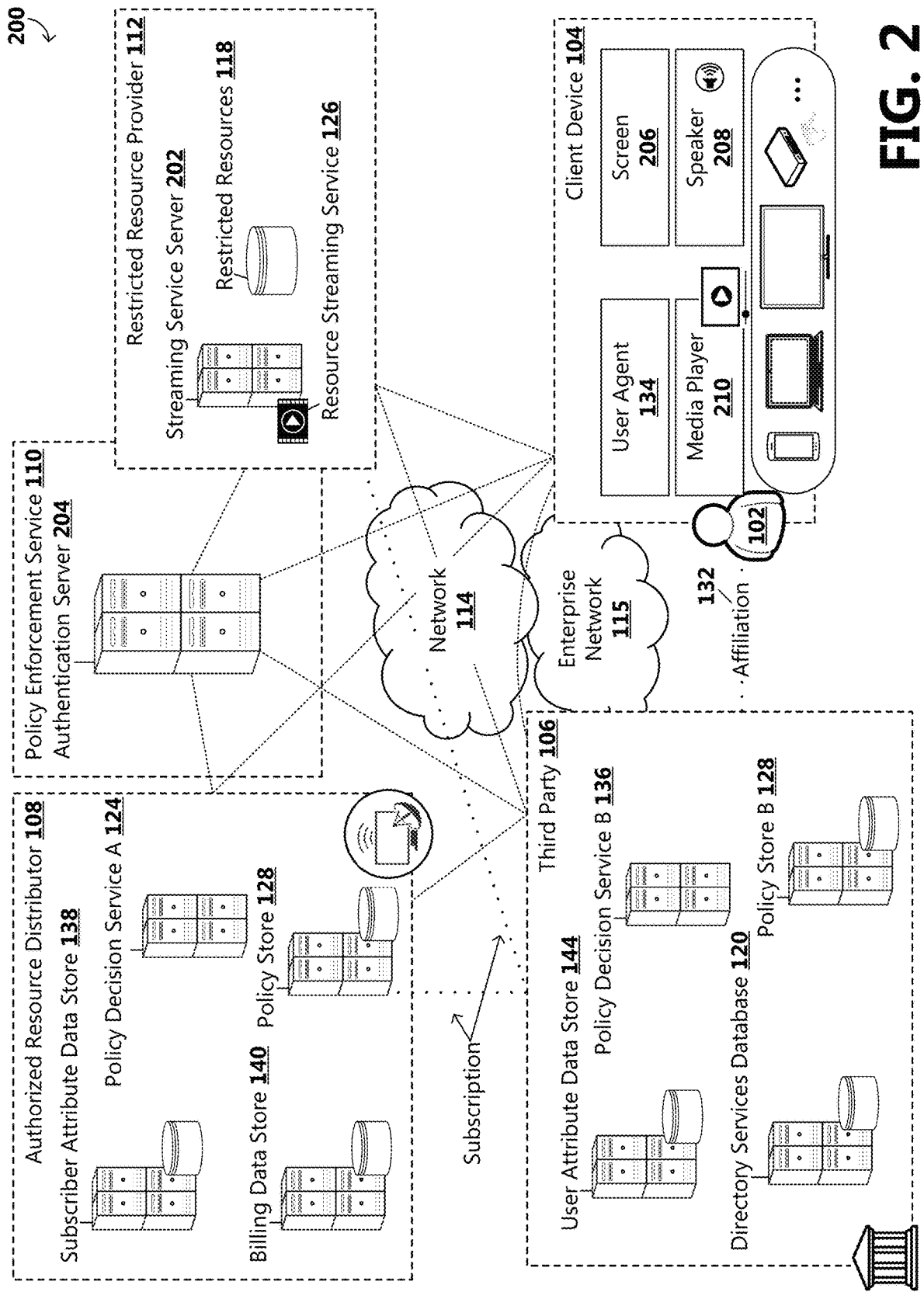
FIG. 2 is a block diagram of components of an example embodiment of a system for providing authentication of an unregistered user affiliated with a registered subscriber for providing the affiliated user access to restricted resources.

FIG. 2 is a block diagram of an example system architecture 200 for authorizing a user's access request to restricted resources 118, wherein the user 102 is not directly associated with a service provider (e.g., the restricted resource provider 112 and/or the authorized resource distributor 108) but who is enabled access to the resources based on the user's affiliation with a registered third-party subscriber 106. With reference now to FIG. 2, the system architecture 200 includes various system components including: the client device 104 used by the user 102 to access restricted resources 118 provided by the restricted resource provider 112; the third-party subscriber 106 with which the user has an affiliation 132 recognized by the authorized resource distributor 108 and that additionally has a subscription for access to resources from a plurality of resource providers including a subscription for access to restricted resources 118 provided by the restricted resource provider 112; the authorized resource distributor 108 with which the third-party subscriber 106 has the subscription; restricted resource provider 112 with which the third-party subscriber 106 has a subscription and that maintains the restricted resources 118 that the user wants to access; the policy enforcement service 110 that mediates authentication and authorization requests between the user client device 104, the authorized resource distributor 108, the restricted resource provider 112, and the third-party subscriber 106; and a network 114,115 or combination of networks over which the client device, the third party, the authorized resource distributor, the restricted resource provider, and the policy enforcement service communicate. According to an aspect, the various system components each include one or more computing devices such as servers, workstations, desktop computers, laptop computers, tablets, mobile phones, smart devices, etc., and one or more databases. Further details of the computing devices and variations thereof can be found in FIGS. 6, 7A, 7B, and 8.

The user client device 104 can be embodied as one of various types of devices (e.g., a desktop computer, a tablet, a mobile phone, a gaming console, a smart device, a set-top box, a dedicated digital media player, a speaker device). For example, the client device 104 is a device that is operative to request and receive content resources, including restricted resources 118. According to an aspect, the client device 104 is operative or configured to execute a user agent 134 operating on the device. For example, the user agent 134 may be a web browser application or a client streaming application provided by the restricted resource provider 112 that is downloaded onto the user's client device 104 that is operative to access content provided by the restricted resource provider 112 over a network 114,115 or combination of networks. The user 102 may use the user agent 134 to visit a website of the restricted resource provider 112, for example, to navigate among the provider's various resource offerings, to select from the resource offerings, and to watch/listen to/interact with one or more pieces of resource content for which the third-party subscriber 106 is subscribed to based on a subscription with the authorized resource distributor 108 and based on a subscription with the restricted resource provider 112 and for which the user 102 is allowed to access based on the user's affiliation 132 with the third party.

In various examples, the restricted resources 118 are embodied as media content (e.g., video content, audio content, gaming content), which the client device 104 can request, receive, and playback the media content for displaying video output on a screen 206 integrated with or communicatively attached to the client device, for playing audio output through a speaker 208 integrated with or communicatively attached to the client device, and/or for enabling interactivity (e.g., playback control, gaming interaction inputs and outputs) between the client device user and the content. In various implementations, the client device 104 comprises or is communicatively attached to a media player 210 illustrative of a software application, module, or computing device operative or configured to decode a stream of media content (e.g., a restricted resource 118 embodied as media content provided by the authorized resource distributor 108 or the restricted resource provider 112) and then play the media content. According to an aspect, the user agent 134 is communicatively attached to the media player 210.

In various implementations, the restricted resource provider 112 serves the role of a content provider that delivers online media content (restricted resources 118) to the user 102, which as described herein is a user affiliated with the third-party subscriber 106, wherein the third party is a subscriber of the restricted resource provider 112 via a subscription with the authorized resource distributor 108 and the third party's subscription with the restricted resource provider. According to an aspect, the restricted resource provider 112 comprises one or a plurality of streaming service servers 202 that are configured to provide the resource streaming service 126 to users.

The resource streaming service 126 is illustrative of a software application, module, or computing device operative or configured to provide an interface and access control to the restricted resource provider's restricted resources 118 to the user 102 via the user agent 134 executing on the user's client device 104. For example, the user 102 can use the user agent 134 to access a web portal of the resource streaming service 126 to view, preview, select, stream, access, and interact with restricted resources 118 embodied as media content (e.g., video, audio, graphics, photos, games, text), special features, account information, and/or messages provided by the restricted resource provider 112. According to an aspect, the user 102 may open a resource streaming service application (user agent 134) on a client device 104 or may use a web browser (user agent 134) to navigate to a webpage of the streaming service 126. The user agent 134 is operative to expose a web portal of the restricted resource provider's streaming service 126 to the user 102.

Figure 3:
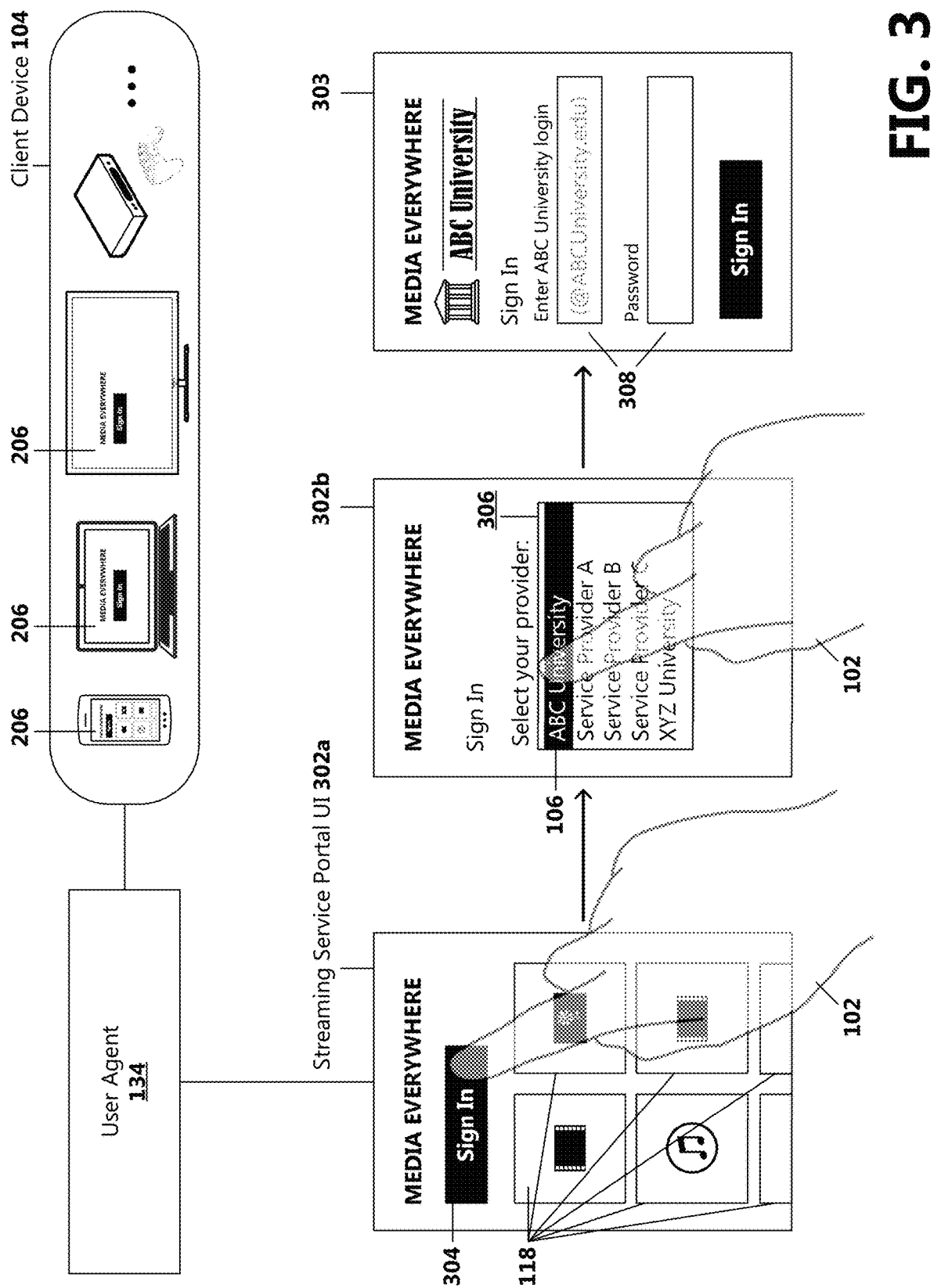
FIG. 3 is illustrates an example streaming service portal user interfaces that can be displayed on the screen of an affiliated user's client device.

Example streaming service portal user interfaces 302a-b (generally, 302) that can be displayed on the screen 206 of the user's client device 104 are illustrated in FIG. 3. As should be appreciated, the example resource streaming service portal user interfaces 302 are provided for illustrative purposes. Other types and configurations of streaming service portal user interfaces 302 are possible and are within the scope of the present disclosure. In various implementations and with reference to FIG. 3, a first streaming service portal user interface 302*a* may include a login button 304 or other user interface control for enabling the user to select to log into the resource streaming service 126. In some examples, restricted resource items 118 may be displayed in the streaming service portal user interface 302, and a selection of a resource item can be received as a selection to log into the streaming service.

A second streaming service portal user interface 302*b* may include a list 306 of supported service providers (e.g., MVPDs, Internet Service Providers (ISPs), the authorized resource distributor 108 with which the third-party subscriber 106 has a subscription) from which the user 102 can select an appropriate service provider or distributor. In various examples, the user 102 (and other affiliated users) may be unaware or unfamiliar with which service provider provides services (e.g., Internet services, video or other media content services) to the third-party subscriber 106 and its affiliated users. Additionally or alternatively, the third-party subscriber 106 may change service providers (authorized resource distributors) from time-to-time, which can cause confusion as to which service provider to select. In some implementations and as illustrated in FIG. 3, the third-party subscriber 106 (e.g., the university of which the user is a student) with which the user 102 is affiliated is recognized as a service provider or an authorized resource distributor of resources to its affiliated users based on the third party's agreement with the authorized resource distributor 108 and the restricted resource provider 112, and is included in the list 306.

In some examples, the user agent 134 is operative to request location information, network signal information, or other context information from the user's client device 104 (e.g., which the client device can detect via one or more sensors (e.g., GPS, wired or wireless network signal scanner) integrated or communicatively attached to the client device), which can be used to determine relevant service providers and authorized resource distributors for inclusion in the list 306. For example, the list 306 can include service providers (including third parties 106 that are recognized by the authorized resource distributor 108 and the restricted resource provider 112 as service providers or authorized resource distributors) that are determined to be geographically near the user 102, associated with a network 115 to which the user's client device 104 is connected, or an enterprise subscriber (e.g., university, employer, landlord) recognized as an authorized resource distributor of resources to its affiliated users (e.g., students, employees, tenants). As illustrated in FIG. 3, the user 102 can select the third-party subscriber 106 with which he/she is affiliated from the list 306. Accordingly, the user agent 134 communicates the user's selection to the streaming service 126. For example, the restricted resource provider 112, in its role as content provider, controls access to its restricted resources 118 and therefore, when the user 102 selects to log into the content source streaming service 126, the content source will want to authenticate the user.

In some examples, responsive to receiving a selection of the third-party subscriber 106, the resource streaming service 126 is configured or operative to redirect the user agent 134 to the policy enforcement service 110 implemented on one or a plurality of authentication servers 204. For example, selection of the third-party subscriber 106 is received as a request to log into the streaming service 126, and the streaming service is operative to forward the request to the policy enforcement service 110. According to an aspect, the selection of the subscriber 106 indicates to the streaming service 126 and the policy enforcement service 110 that the login request is associated with a subscriber-affiliated user. Accordingly, the policy enforcement service 110 is operative or configured to make a call to the subscriber directory services database 120 to authenticate the affiliated user 102. Various markup language technologies can be used to communicate authentication and authorization messages between parties. Examples include using a SAML (Security Assertion Markup Language) and XACML (eXtensible Access Control Markup Language). Other message data types are possible and can be used in exchanging authentication and authorization messages.

A third-party subscriber login user interface 303 may be displayed, which provides fields 308 for enabling the user 102 to enter his/her third party-related authentication credentials. As described above, according to an aspect, the authentication credentials used by the user 102 to login into the resource streaming service 126 are the login credentials the affiliated user uses for accessing an account or online services associated with the third-party subscriber 106 (e.g., a university student using student login credentials associated with the student's university account, wherein the university is the third party and the student is the affiliated user). For example, when a request for access to the restricted resource streaming service 126 is received from a requesting user's client device 104, authentication credentials entered by the user 102 are transmitted to an appropriate authentication provider (e.g., third-party subscriber 106 directory services database 120). If the affiliated user 102 is successfully authenticated, the directory services database 120 returns a success or pass result to the policy enforcement service 110. Otherwise, an invalid credentials or other failure result is returned to the authentication service 110.

With reference again to FIG. 2, according to aspects, when authentication is successful (e.g., a "pass" or "success" result is received), the policy enforcement service 110 is operative to determine whether the user 102 is authorized to access the restricted resource distributor's restricted resources 118 by evaluating various attributes provided by one or more policy information points against stored policies. As described above, the policy enforcement service 110 is operative to send a first authorization request to the policy decision service A 124 at the authorized resource distributor 108 for determining whether the user 102 is authorized to access the restricted resource provider's restricted resources 118 based on one or more authorized resource distributor authorization policies. The policy enforcement service 110 is operative to receive a response to the first request indicating the policy decision service A's 124 authorization access decision. Further, the policy enforcement service 110 is operative to send a second authorization request to the policy decision service B 136 at the third-party subscriber 106 for determining whether the user 102 is authorized to access the restricted resource provider's restricted resources 118 based on one or more third party authorization policies. The policy enforcement service 110 is operative to receive a response to the second request indicating the policy decision service B's 136 authorization access decision.

Based on the authentication decision and the authorization decisions, the policy enforcement service 110 is operative to either permit or deny user access to the restricted resources 118. For example, based on the authentication response from the third-party subscriber 106 and the first and second authorization responses from the authorized resource distributor 108 and the third-party subscriber 106, the policy enforcement service 110 responds to the resource streaming service 126 with results of the login request and, in some examples, authorization attributes. When the user 102 is authorized to access restricted resources 118 as indicated by the authentication and authorization decisions, the resource streaming service 126 is operative to provide the user access to the restricted resources via the user agent 134.

Figure 4:
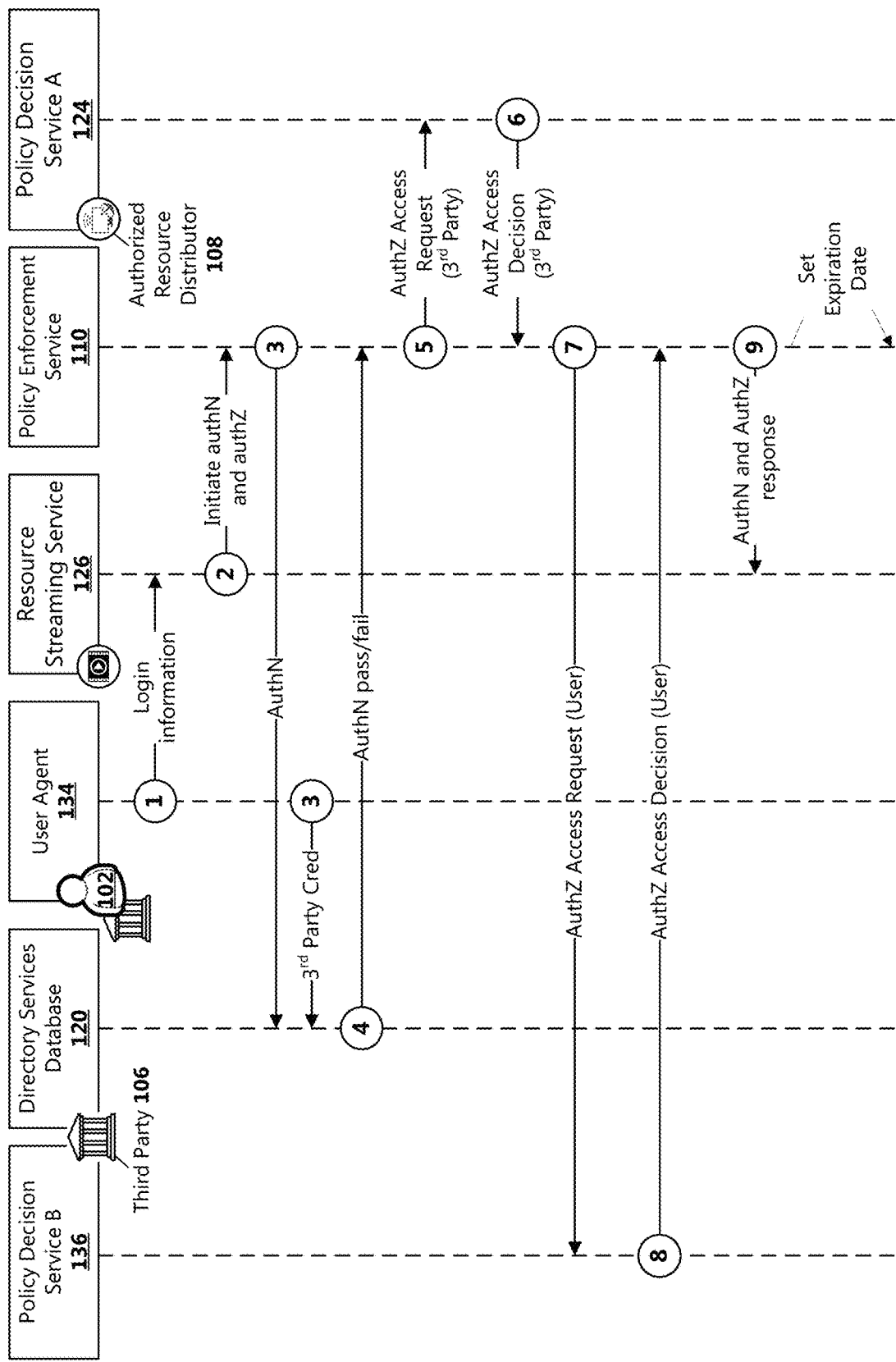
FIG. 4 illustrates an example sequence diagram showing a sequence of messages exchanged between components to carry out authentication of an unregistered user affiliated with a registered subscriber for providing the affiliated user access to restricted resources according to an embodiment.

FIG. 4, is a sequence diagram showing an example sequence of messages exchanged between components of the system 200 to carry out authentication and authorization of an unregistered user 102 affiliated with a registered subscriber (third-party subscriber 106) for providing the affiliated user access to restricted resources 118 (media content) according to an embodiment. In FIG. 4, various arrows are labeled with circled numerals indicative of an example flow of data and/or operations among the components. As should be appreciated, some messages can be exchanged out of the order (e.g., substantially concurrently or in reverse order) as shown in FIG. 4. In general, a user 102 affiliated with a third-party subscriber 106 that is a subscriber to services from an authorized resource distributor 108 and to restricted resources 118 from a restricted resource provider 112 is seeking access to the restricted resources. Using a client device 104, the affiliated user 102 opens a user agent 134 that exposes a web portal user interface 302 of the restricted resource provider's 112 streaming service 126 to the user. The user 102 selects the third-party subscriber 106 with which he/she is affiliated. The user's selection of the third-party subscriber 106 is sent as a login request to the content source streaming service 126. This communication is represented in FIG. 4 as a circled arrow one (1).

In this example, the content source streaming service 126 receives the login request and forwards the request to the policy enforcement service 110 to check whether the user 102 is authorized to access the restricted resources 118. This communication is represented as circled arrow two (2). Based on the login information, the policy enforcement service 110 can determine that the user 102 is a user affiliated with the third-party subscriber 106. Accordingly, the policy enforcement service 110 makes a call to a third party authentication provider embodied as a directory services database 120 to authenticate the user 102. This communication is represented as circled arrow three (3). According to examples, the user is 102 prompted to enter login credentials associated with the selected third-party subscriber 106, which are communicated to the directory services database 120. In some examples, one or more attributes associated with the user 102, the user's client device 104, or the user's environment are provided in the communication.

The third party directory services database 120 contains electronic identity data that the user's login information can be checked against for validating that the user is who he/she says he/she is. A login pass or fail message is sent by the third party directory services database 120 to the policy enforcement service 110, which is represented as circled arrow four (4).

When the affiliated user 102 is authenticated, the policy enforcement service 110 checks with an authorized resource distributor policy decision service A 124 embodied as an identity management server to verify that the third-party subscriber 106 is an authorized broker of restricted resources 118 to affiliated users based on an agreement between the authorized resource distributor 108 and the third-party subscriber 106. This authorization request is represented as circled arrow five (5). In some implementations, a verification of the third party's business account status is also performed for ensuring that the third party's account with the authorized resource distributor 108 is active and in good standing. The authorized resource distributor policy decision service A 124 responds to the policy enforcement service 110 with a pass or fail response. This communication is represented as circled arrow six (6).

According to an aspect, granting the user 102 access to the restricted resources 118 includes multi-party authorization. For example, based on policy data indicating that authorization for access to the restricted resources 118 is needed from the authorized resource distributor 108 (for granting the third-party subscriber 106 access) and from the third-party subscriber 106 (for granting the affiliated user 102 access), the policy enforcement service 110 is enabled to determine to which parties to send the second authorization request. When multi-party authorization is indicated, the policy enforcement service 110 sends an authorization request to a third party policy decision service B 124 embodied as an account administrator server. This communication is represented as circled arrow seven (7).

The third party policy decision service B 136 determines the user's entitlements for restricted resource access based on one or a combination of eligibility criteria rules that define the user's content streaming privileges based on one or a combination of authorization policies. The third party policy decision service B 136 communicates a response (e.g., pass/fail, allow/not allow, user's entitlements) to the policy enforcement service 110, which is represented in FIG. 4 as circled arrow eight (8).

The policy enforcement service 110 makes a decision based on received authorization decision responses and sends an authentication and authorization response to the streaming service 126 that indicates whether the affiliated user 102 is granted access to the restricted resources 118 or otherwise. This communication is represented as circled arrow nine (9).

Figure 5:
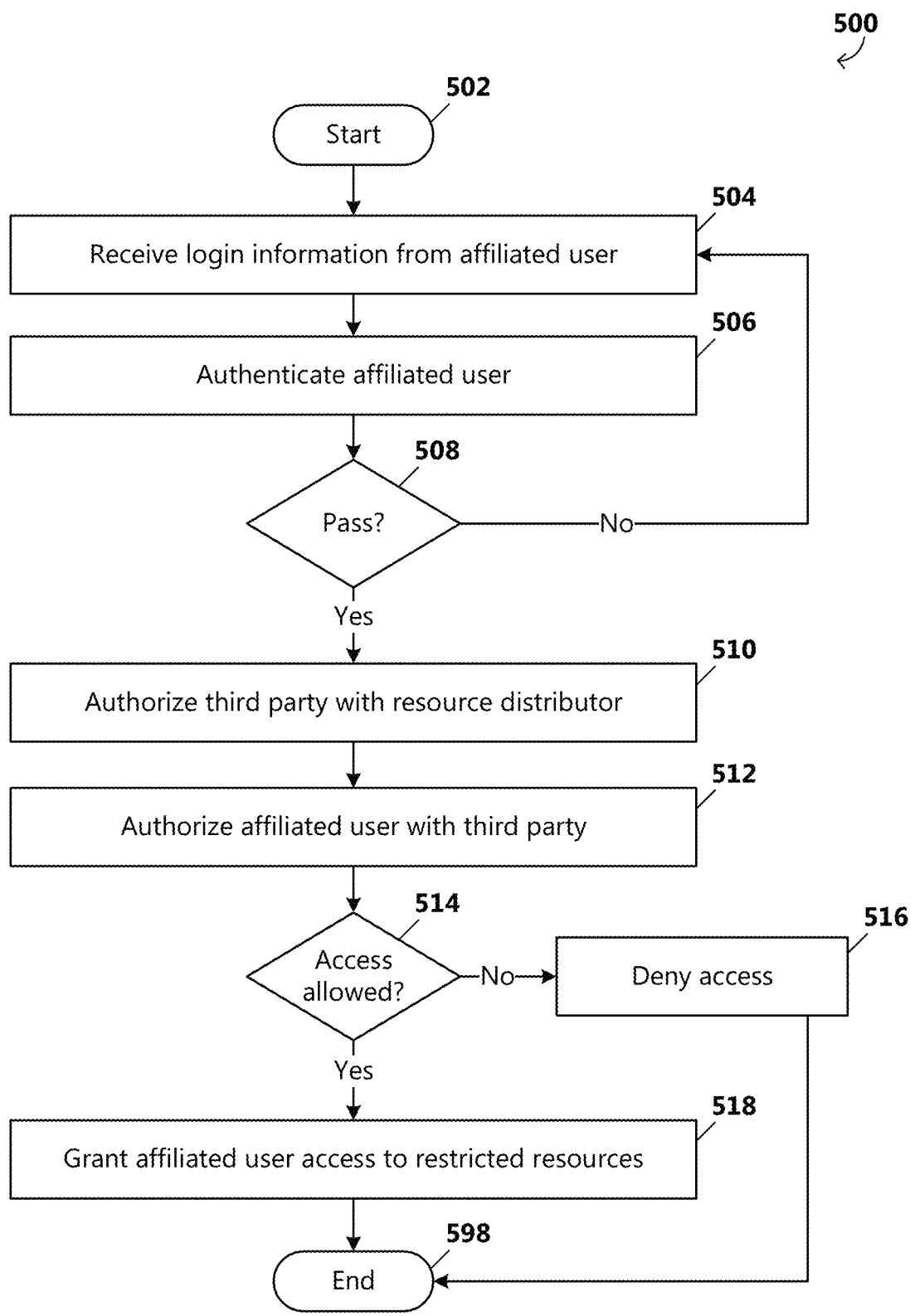
FIG. 5 is a flow diagram depicting general stages of an example process for authenticating an unregistered user affiliated with a registered subscriber for providing the affiliated user access to restricted resources according to an embodiment.

FIG. 5 is a flow diagram that depicts general stages of an example method 500 for authenticating an unregistered user affiliated with a registered subscriber for providing the affiliated user access to restricted resources according to an according to an embodiment. The method 500 begins at START OPERATION 502, and proceeds to OPERATION 504 where the method 500 uses a user agent 134 operating on a user's client device 104 to enable a user affiliated with a third-party subscriber 106 that is a subscriber of media programming services provided by the authorized resource distributor 108 and a subscriber of media content provided by the restricted resource provider 112 to access a web portal user interface 302 of the restricted resource provider's 112 streaming service 126. The method 500 further uses the user agent 134 to receive, from the affiliated user 102, a selection to sign in or log in to the resource streaming service 126 and a selection of the third-party subscriber 106 with which the user is affiliated, and to transmit the affiliated user's selections to the resource streaming service 126. At OPERATION 504, the method 500 further uses the streaming service 126 to forward the affiliated user's login request and login information to a policy enforcement service 110 to verify the user's identity and to check whether the user 102 is authorized to access the restricted resources 118. In various implementations, the restricted resource provider 112 uses a trusted third-party policy enforcement service 110.

At OPERATION 506, the method 500 uses the policy enforcement service 110 to authenticate the user 102 based on the login information selected and input by the user. For example, at OPERATION 506, the method 500 uses the policy enforcement service 110 to make a call to a directory services database 120 of the third-party subscriber 106 selected by the affiliated user 102 to validate the user's identity and to receive an authentication response from the directory services database. The user 102 may then be prompted to and then may enter login information associated with the user's affiliation with the third party (e.g., login information for an account the affiliated user has with the third party), which is transmitted to the third-party subscriber 106 directory services database 120. At OPERATION 506, the method 500 further uses the policy enforcement service 110 to receive an authentication response from the directory services database.

At DECISION OPERATION 508, the method 500 uses the policy enforcement service 110 to determine whether the user 102 is authenticated. When the authentication response from the third-party subscriber 106 directory services database 120 indicates that the affiliated user's login information is successfully authenticated, the method 500 further uses the policy enforcement service 110 to determine the affiliated user's access permissions to restricted resources 118 provided by the restricted resource provider 112. For example, at OPERATION 510, the method 500 uses the policy enforcement service 110 to send a first authorization request to the authorized resource distributor policy decision service A 124 to verify that the third-party subscriber 106 is an authorized broker of media content to affiliated users based on an agreement between the authorized resource distributor 108 and the third-party subscriber 106. In some examples, the method 500 further uses the policy enforcement service 110 at OPERATION 510 to verify the third party's account with the authorized resource distributor 108 is active and in good standing. At OPERATION 510, the method 500 uses the policy enforcement service 110 to receive a pass or fail authorization response from the authorized resource distributor policy decision service A 124 indicating whether the user 102 has access to the restricted resource provider's restricted resources 118 based on an evaluation of rules defined in policies provided by the authorized resource distributor 108 against various attributes. For example, these policies (stored in policy store A 128) can correlate with specifications in the third party's subscription with the authorized resource distributor 108 and the third party's subscription with the restricted resource provider 112.

At OPERATION 512, the method 500 uses the policy enforcement service 110 to send a second authorization request to the third party policy decision service B 136 to determine the user's entitlements to access restricted resources 118 provided by the restricted resource provider 112 based on an evaluation of various authorization access rules against various attributes. For example, these authorization access rules can be based on one or a plurality of policies stipulated by the third-party subscriber 106. The method 500 further uses the policy enforcement service 110 at OPERATION 512 to receive an authorization response (e.g., pass/fail, allow/not allow, user's entitlements/authorization attributes) from the third party policy decision service B 136.

AT DECISION OPERATION 514, the method 500 uses the policy enforcement service 110 to determine whether the affiliated user 102 is authorized to access the restricted resource provider restricted resources 118. The affiliated user's authorization status can be based on the authentication and authorization responses received from the third-party subscriber 106 and the authorized resource distributor 108 (e.g., which can be based on an evaluation of the third party's and the authorized resource distributor's policies against various stored and collected attributes. For example, the affiliated user's authorization status can be based at least in part on his/her location, the network his/her client device 104 is connected to, the time of day, the day of the week, the user's grades, attendance, student status, etc. When a determination is made that the affiliated user 102 is granted access to use the resource streaming service 126, the method 500 uses the policy enforcement service 110 to communicate an acknowledgement to the resource source streaming service 126 that the affiliated user 102 is authorized to access the content source media content 118.

At OPERATION 518, the method 500 uses the streaming service 126 to maintain a user credential for a specified time period and to allow the affiliated user 102 access to restricted resources 118. For example, the affiliated user 102 may select a media content item from an assortment of media content offered by the restricted resource provider 112, and the method 500 uses the resource streaming service 126 to stream the selected media content item to the user agent 134 operating on the user's client device 104 for playback to the user via a media player 210.

When access to content source media content 118 is not allowed at DECISION OPERATION 514, at OPERATION 516, the method 500 uses the policy enforcement service 110 to communicate a notification to the resource streaming service 126 that indicates that the affiliated user 102 is not entitled to use the streaming service for accessing restricted resources 118. Accordingly, the streaming service 126 can deny the affiliated user 102 access to restricted resources 118. The method 500 ends at OPERATION 598.

Figure 6:
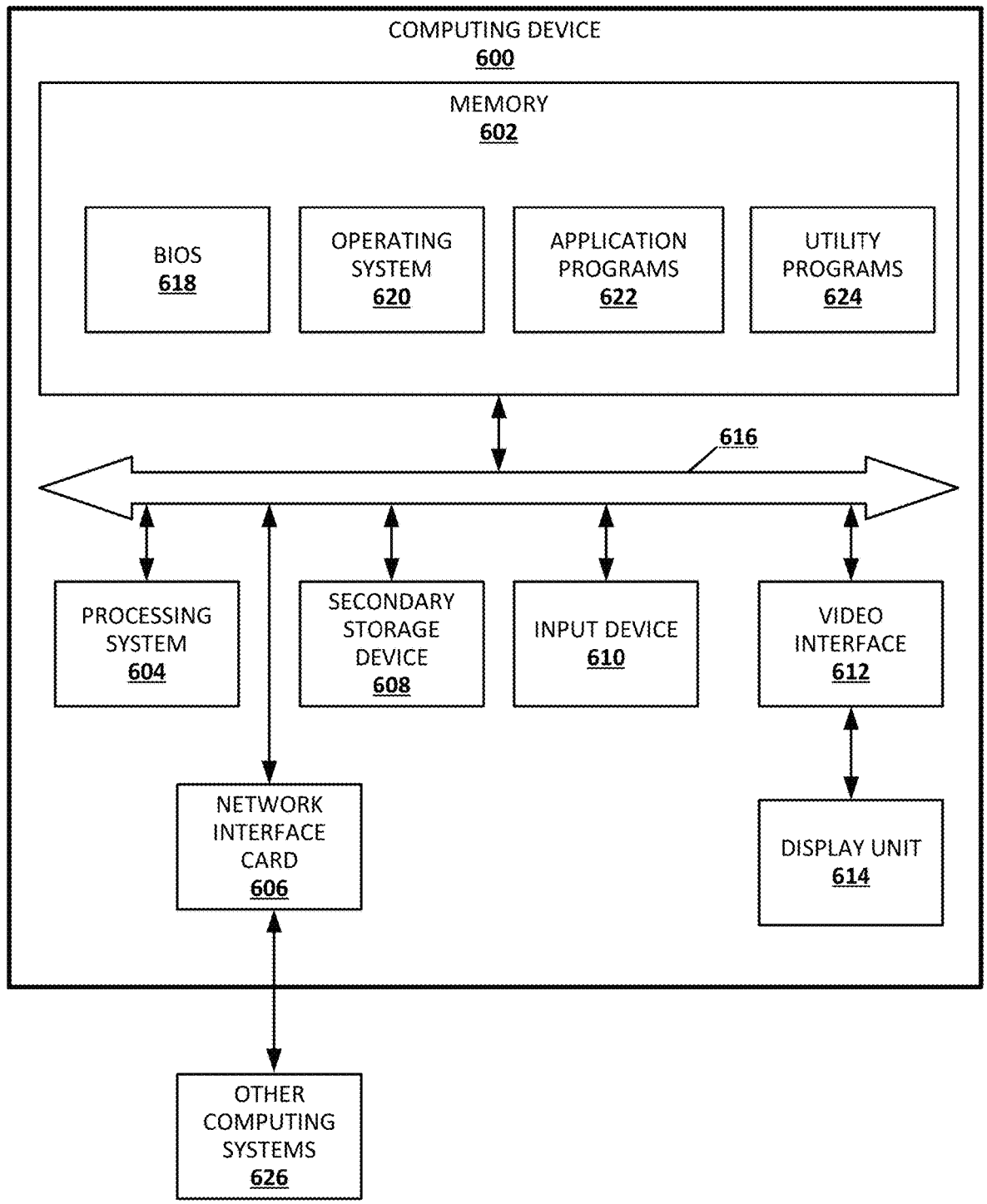
FIG. 6 is a block diagram illustrating example physical components of a computing device or system with which embodiments may be practiced.

FIG. 6 is a block diagram illustrating example physical components of a computing device or system 600 with which embodiments may be practiced. It should be appreciated that in other embodiments, different hardware components other than those illustrated in the example of FIG. 6 may be used. Computing devices may be implemented in different ways in different embodiments. For instance, in the example of FIG. 6, the computing device 600 includes a processing system 604, memory 602, a network interface 606 (wired and/or wireless), radio/antenna 607, a secondary storage device 608, an input device 610, a video interface 612, a display unit 614, and a communication medium 616. In other embodiments, the computing device 600 may be implemented using more or fewer hardware components (e.g., a video interface, a display unit, or an input device) or in combination with other types of computer systems and program modules 626.

The memory 602 includes one or more computer-readable storage media capable of storing data and/or computer-executable instructions. Memory 602 may store the computer-executable instructions that, when executed by processor 604, cause allocation and/or reallocation operations as part of load balancing internal connections. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs or program code 622 that, when executed by the processing system 604, cause the computing device 600 to provide applications (e.g., user agent 134) to users. The memory 602 also stores one or more utility programs 624 that, when executed by the processing system 604, cause the computing device 600 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 7:
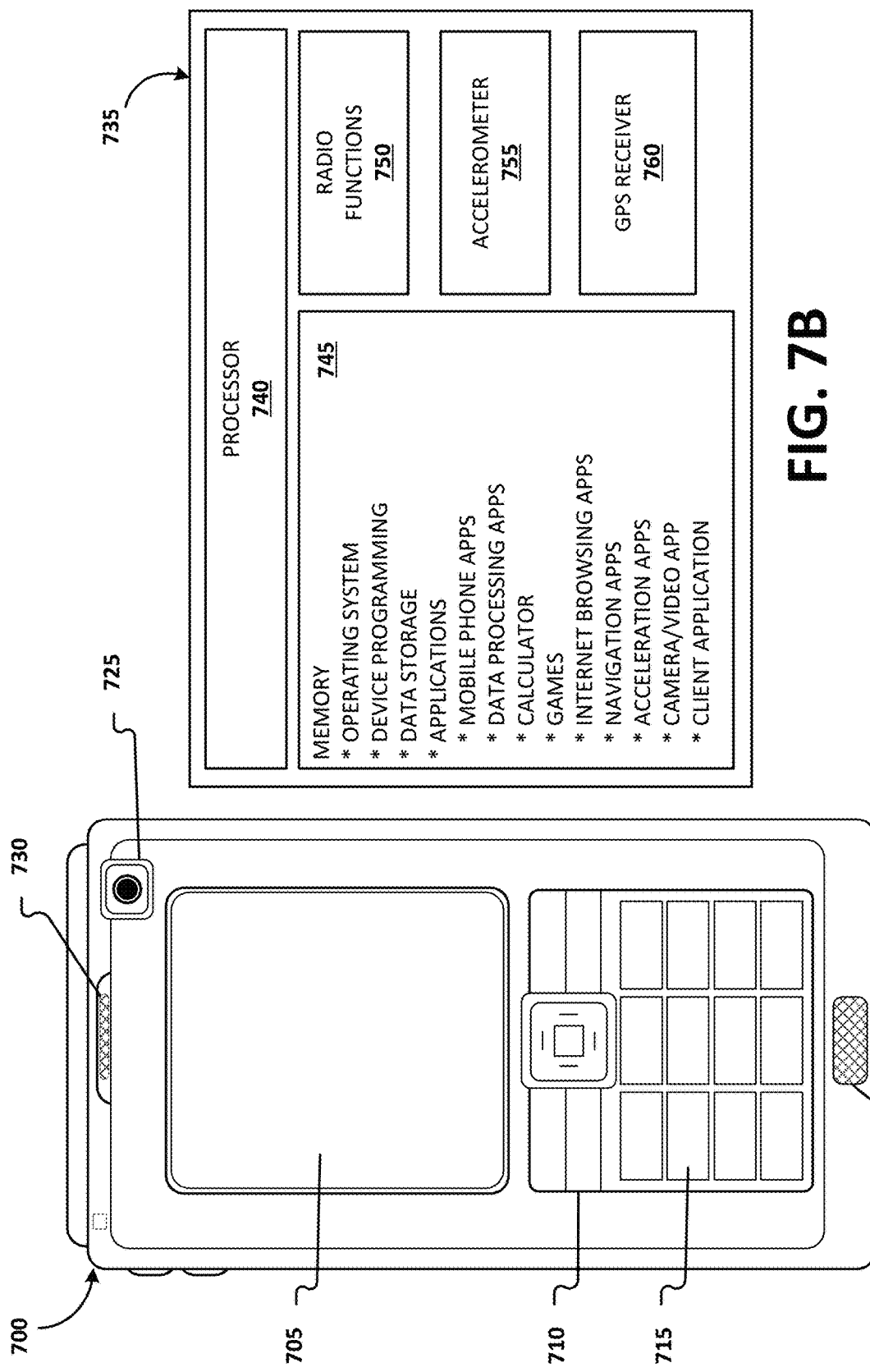
FIGS. 7A and 7B are block diagrams illustrating example physical components of a suitable mobile computing environment with which aspects of the present disclosure can be practiced.

FIGS. 7A-7B illustrate a suitable mobile computing device 700 or environment, for example, a mobile computing device or smart phone, a tablet personal computer, a laptop computer, or other client device 104, with which aspects can be practiced. The mobile computing device 700 is illustrative of any suitable device operative to send, receive and process wireless communications. A display screen 705 is operative for displaying a variety of information such as information about incoming and outgoing communications, as well as, a variety of data and displayable objects, for example, text, alphanumeric data, photographs, and the like.

Data input to the mobile computing device 700 can be performed via a variety of suitable means, such as, touch screen input via the display screen 705, keyboard or keypad input via a data entry area 710, key input via one or more selectable buttons or controls 715, voice input via a microphone 718 disposed on the mobile computing device 700, photographic input via a camera 725 functionality associated with the mobile computing device 700, or any other suitable input means. Data can be output via the mobile computing device 700 via any suitable output means, including but not limited to, display on the display screen 705, audible output via an associated speaker 730 or connected earphone system, vibration module for providing tactile output, and the like.

Referring now to FIG. 7B, operational unit 735 is illustrative of internal operating functionality of the mobile computing device 700. A processor 740 is illustrative of a computer processor for processing incoming and outgoing data and communications and controlling operation of the device and associated software applications via a mobile computing device operating system. Memory 745 can be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the user agent 134 can be stored locally on mobile computing device 700.

Mobile computing device 700 can contain an accelerometer 755 for detecting acceleration, and can be used to sense orientation, vibration, and/or shock. Mobile computing device 700 can contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the mobile computing device 700 to communicate with other communication devices and systems via a wireless network. Radio functions 750 can be utilized to communicate with a wireless or WIFI-based positioning system to determine a device location.

FIG. 8 is a block diagram illustrating a cable television services system 800 (hereafter referred to as "CATV") architecture providing an operating environment according to an aspect. According to aspects, the service provider 108 can operate in the form of a CATV 800 as illustrated and described in FIG. 8. As should be appreciated, a CATV services system 800 is but one of various types of systems that can be utilized for providing an operating environment for providing supplemental content functionality described herein. Referring now to FIG. 8, digital and analog video programming, information content and interactive television services are provided via a hybrid fiber coax (HFC) network 815 to a television set 816 for consumption by a cable television/services system customer. As is known to those skilled in the art, HFC networks 815 combine both optical fiber and coaxial cable lines. Typically, optical fiber runs from the cable head end 810 to neighborhoods of subscribers. Coaxial cable runs from the optical fiber feeders to each customer or subscriber. The functionality of the HFC network 815 allows for efficient bidirectional data flow between the set-top box 818 and the application server 840 of the aspect.

The CATV system 800 is in the form of a distributed client-server computing system for providing video and data flow across the HFC network 815 between server-side services providers (e.g., cable television/services providers) via a server-side head end 810 and a client-side customer via a set-top box (STB) 818 functionally connected to a customer receiving device, such as the television set 816. As is understood by those skilled in the art, modern CATV systems 800 can provide a variety of services across the HFC network 815 including traditional digital and analog video programming, telephone services, high speed Internet access, video-on-demand, and services.

On the client side of the CATV system 800, digital and analog video programming and digital and analog data are provided to the customer television set 816 via the STB 818. Interactive television services that allow a customer to input data to the CATV system 800 likewise are provided by the STB 818. As illustrated in FIG. 8, the STB 818 is a multipurpose computing device having a computer processor, memory, and an input/output mechanism. The input/output mechanism receives input from server-side processes via the HFC network 815 and from customers via input devices such as a remote control device 828, keyboard 830, or other computing device, such as a tablet/slate computer, smart phone, etc. The remote control device 828 and the keyboard 830 can communicate with the STB 818 via a suitable communication transport such as the infrared connection 832. The remote control device 828 can include a biometric input module 829. The STB 818 also includes a video processor for processing and providing digital and analog video signaling to the television set 816 via a cable communication transport 834. A multi-channel tuner is provided for processing video and data to and from the STB 818 and the server-side head end system 810, described below.

The STB 818 also includes an operating system 822 for directing the functions of the STB 818 in conjunction with a variety of client applications 825. For example, if a client application 825 requires a news flash from a third-party news source to be displayed on the television 816, the operating system 822 can cause the graphics functionality and video processor of the STB 818, for example, to output the news flash to the television 816 at the direction of the client application 825 responsible for displaying news items.

Because a variety of different operating systems 822 can be utilized by a variety of different brands and types of set-top boxes 818, a middleware layer 824 can be provided to allow a given software application to be executed by a variety of different operating systems. According to an embodiment, the middleware layer 824 can include a set of application programming interfaces (APIs) that are exposed to client applications and operating systems 822 that allow client applications 825 to communicate with the operating systems 822 through common data calls understood via the API set. As described below, a corresponding middleware layer 842 is included on the server side of the CATV system 800 for facilitating communication between the server-side application server and the client-side STB 818. The middleware layer 842 of the server-side application server and the middleware layer 824 of the client-side STB 818 can format data passed between the client side and server side according to the Extensible Markup Language (XML).

According to one aspect, the STB 818 passes digital and analog video and data signaling to the television 816 via a one-way communication transport 834. According to other aspects, two-way communication transports can be utilized, for example, via high definition multimedia (HDMI) ports. The STB 818 can receive video and data from the server side of the CATV system 800 via the HFC network 815 through a video/data downlink and data via a data downlink. The STB 818 can transmit data from the client side of the CATV system 800 to the server side of the CATV system 800 via the HFC network 815 via one data uplink. The video/data downlink is an "in band" downlink that allows for digital and analog video and data signaling from the server side of the CATV system 800 through the HFC network 815 to the STB 818 for use by the STB 818 and for distribution to the television set 816. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 8, between the HFC network 815 and the set-top box 818 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 818 and the server-side application server 840 is typically passed through the "out of band" data links. Alternatively, an "in band" data carousel can be positioned in an "in band" channel into which a data feed can be processed from the application server 840 through the HFC network 815 to the STB 818. Operation of data transport between components of the CATV system 800, described with reference to FIG. 8, is well known to those skilled in the art.

Referring still to FIG. 8, the head end 810 of the CATV system 800 is positioned on the server side of the CATV system and includes hardware and software systems responsible for originating and managing content for distributing through the HFC network 815 to client-side STBs 818 for presentation to customers. As described above, a number of services can be provided by the CATV system 800, including digital and analog video programming, interactive television services, telephone services, video-on-demand services, targeted advertising, and/or provision of supplemental content.

The application server 840 can be configured as a computing system operative to assemble and manage data sent to and received from the STB 818 via the HFC network 815. As described above, the application server 840 includes a middleware layer 842 for processing and preparing data from the head end 810 of the CATV system 800 for receipt and use by the client-side STB 818. For example, the application server 840 via the middleware layer 842 can obtain supplemental content from third-party services 846 via the Internet 844 for transmitting to a customer through the HFC network 815, the STB 818, and recording by a local or remote DVR. For example, content metadata from a third-party content provider service can be downloaded by the application server 840 via the Internet 844. When the application server 840 receives the downloaded content metadata, the middleware layer 842 can be utilized to format the content metadata for receipt and use by the STB 818. Therefore, content metadata can be sent and categorized based on the availability to the customer's program guide data.

According to one embodiment, data obtained and managed by the middleware layer 842 of the application server 840 is formatted according to the Extensible Markup Language and is passed to the STB 818 through the HFC network 815 where the XML-formatted data can be utilized by a client application 825 in concert with the middleware layer 824, as described above. As should be appreciated by those skilled in the art, a variety of third-party services data 846, including news data, weather data, sports data and other information content can be obtained by the application server 840 via distributed computing environments such as the Internet 844 for provision to customers via the HFC network 815 and the STB 818.

According to aspects, the application server 840 obtains customer support services data, including billing data, information on customer work order status, answers to frequently asked questions, services provider contact information, and the like from data services 826 for provision to the customer via an interactive television session. The data services 826 include a number of services operated by the services provider of the CATV system 800 which can include profile and other data associated with a given customer.

A billing system 862 can include information such as a customer's name, street address, business identification number, Social Security number, credit history, and information regarding services and products subscribed to by the customer. According to embodiments, the billing system 862 can also include billing data for services and products subscribed to by the customer for bill processing, billing presentment and payment receipt.

A customer information database 868 can include general information about customers such as place of employment, business address, business telephone number, and demographic information such as age, gender, educational level, and the like. The customer information database 868 can also include information on pending work orders for services or products ordered by the customer. The customer information database 868 can also include general customer information such as answers to frequently asked customer questions and contact information for various service provider offices/departments. As should be understood, this information can be stored in a variety of disparate databases operated by the cable services provider.

Referring still to FIG. 8, web services system 850 is illustrated between the application server 840 and the data services 826. According to aspects, web services system 850 serves as a collection point for data requested from each of the disparate data services systems comprising the data services 826. According to aspects, when the application server 840 requires customer services data from one or more of the data services 826, the application server 840 passes a data query to the web services system 850. The web services system 850 formulates a data query to each of the available data services systems for obtaining any required data for a requesting customer as identified by a set-top box identification associated with the customer.

The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above. An authentication system 866 can include information such as secure user names, subscriber profiles, subscriber IDs, and passwords utilized by customers for access to network services. According to aspects, the authentication system 866 can perform the functions of the policy enforcement service 110 as described above with reference to FIG. 1. As should be understood by those skilled in the art, the disparate systems 850, 862, 866, 868 can be integrated or provided in any combination of separate systems, wherein FIG. 8 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for enabling access to restricted resources, the system comprising:
    at least one processor;
    a memory storage device including instructions that when executed by the at least one processor are operable to:
        receive a request from a user device of a user to access a restricted resource associated with a restricted resource provider, wherein the user is not subscribed to the restricted resource provider but is affiliated with a third-party subscriber;
        in response to receipt of the request to access the restricted resource associated with the restricted resource provider from the user device, begin a multi-party authentication process that includes:
            transmission of an authentication request to an authentication provider associated with the third-party subscriber that includes a call to a directory services database to authenticate that the user is affiliated with the third-party subscriber, wherein the authentication request includes user login credentials associated with a user account with the third-party subscriber;
        responsive to receiving an indication from the authentication provider that the authentication request is approved, send an authorization access request associated with the third-party subscriber to a policy decision service managed by an authorized resource distributor to provide access to the restricted resource;
        receive, from the policy decision service managed by the authorized resource distributor, an authorization access response that indicates whether the third-party subscriber is authorized to access the restricted resource identified in the request to access the restricted resource from the user device and authorized to distribute the restricted resource to authorized users of a network provided by the third-party; and
        grant permission to the user device to access the restricted resource via the authorized resource distributor when the third-party subscriber is authorized to access and distribute the restricted resource.

2. The system of claim 1, wherein the user is affiliated with the third-party subscriber based on an affiliation recognized by the restricted resource provider and the authorized resource distributor of the restricted resources, wherein:
    the third-party subscriber is a university; and
    the user is a student of the university.

3. The system of claim 1, wherein:
    the policy decision service is an identity management server; and
    an authorization access decision made by the policy decision service is made based on an evaluation of one or more authorization policies against attribute information associated with the third-party subscriber.

4. The system of claim 3, wherein one authorization policy of the one or more authorization policies indicates a requirement that the third-party subscriber is a subscriber of the authorized resource distributor and a subscriber of the restricted resource provider and that the third-party subscriber is an authorized broker of the restricted resources to affiliated users.

5. The system of claim 3, wherein:
    the one or more authorization policies are stored in a policy store; and
    in making the authorization access decision, the policy decision service evaluates rules defined in the one or more policies against the attribute information associated with the third-party subscriber for determining whether the rules are satisfied.

6. The system of claim 5, wherein:
    one authorization policy of the one or more authorization policies indicates a requirement that the third-party subscriber has an active account with the authorized resource distributor that is in good standing; and
    in evaluating a rule defined in the one authorization policy, the policy decision service is operative to evaluate the rule against attribute information associated with the third-party subscriber's business account status, wherein the attribute information associated with the third-party subscriber's business account status is stored in a policy information point embodied as a billing data store.

7. The system of claim 1, wherein the system is further operative to:
  send a second authorization access request to a second policy decision service, wherein the second policy decision service is associated with the third-party subscriber; and
  receive, from the second policy decision service, a second response comprising a second authorization access decision made by the second policy decision service indicating whether the user is allowed access to the restricted resources; and wherein:
  in permitting or denying the user access to the restricted resources, the system utilizes a first authorization access decision and the second authorization access decision.

8. The system of claim 7, wherein:
  the second policy decision service is an account administrative server; and
  the second authorization access decision is made based on an evaluation of one or more authorization policies against attribute information associated with one or more of:
  the user;
  the user's client device; and
  the environment.

9. The system of claim 7, wherein the one or more authorization policies indicate requirements associated with one or more of:
  the user's student status;
  the user's housing status;
  the client device's network connection status;
  the user's grade point average status;
  the user's student category;
  the client device's location status;
  date of the request; and
  time of the request.

10. The system of claim 7, wherein the second policy decision service is operable to evaluate the one or more authorization policies against attribute information provided by one or more policy information points, wherein the one or more policy information points include at least one of:
  a user attribute store associated with the third-party subscriber; and
  a user login request, wherein the user login request comprises context attribute information sensed by one or more sensors integrated with or communicatively attached to the client device.

11. The system of claim 7, wherein in permitting or denying the user access to the restricted resource, a policy enforcement service is operable to make a permit decision when:
  a first authorization access response indicates that the third-party subscriber is allowed access to the restricted resources and that the third-party subscriber is an authorized broker of the restricted resources to users affiliated with the third-party subscriber; and
  the second authorization access response indicates that the user is allowed access to the restricted resource.

12. The system of claim 1, wherein the restricted resource provider and the authorized resource distributor are a same entity.

13. A method for enabling access to restricted resources, the method comprising:
  receiving a request from a user device of a user to access a restricted resource associated with a restricted resource provider, wherein the user is not subscribed to the restricted resource provider but affiliated with a third-party subscriber of the restricted resource provider;
  in response to receipt of the request to access the restricted resource associated with the restricted resource provider from the user device, begin a multi-party authentication process that includes:
    transmitting an authentication request to an authentication provider associated with the third-party subscriber that includes a call to a directory services database to authenticate that the user is affiliated with the third-party subscriber, wherein the authentication request includes user login credentials associated with a user account with the third-party subscriber;
    responsive to receiving an indication from the authentication provider that the authentication request is approved, sending an authorization access request associated with the third-party subscriber to a policy decision service managed by an authorized resource distributor to provide access to the restricted resource;
    receiving, from the policy decision service managed by the authorized resource distributor, an authorization access response that indicates whether the third-party subscriber is authorized to access the restricted resource identified in the request to access the restricted resource from the user device and authorized to distribute the restricted resource to authorized users of a network provided by the third-party subscriber; and;
    granting permission to the user device to access the restricted resource via the authorized resource distributor when the third-party subscriber is authorized to access and distribute the restricted resource.

14. The method of claim 13, wherein receiving the authorization access response comprises receiving an indication of a decision made by the policy decision service based on an evaluation of one or more authorized resource distributor-associated authorization policies against attribute information associated with the third-party subscriber.

15. The method of claim 14, wherein evaluating one or more authorized resource distributor-associated authorization policies against attribute information associated with the third-party subscriber comprises:
  evaluating subscriber attribute data for determining whether:
    the third-party subscriber is a subscriber of the authorized resource distributor and a subscriber of the restricted resource provider; and
    the third-party subscriber is an authorized broker of the restricted resources to affiliated users; and
  evaluating billing data for determining whether the third-party subscriber has an active account with the authorized resource distributor that is in good standing.

16. The method of claim 13, further comprising:
  sending a second authorization access request to a second policy decision service, wherein the second policy decision service is associated with the third-party subscriber; and
  receiving, from the second policy decision service, a second authorization access response comprising a decision made by the second policy decision service indicating whether the user is allowed access to the restricted resources; wherein:
    making a login request decision permitting or denying the user access to the restricted resources comprises making the login request decision based on a first authorization access response and the second authorization access response; and receiving the second response comprises receiving an indication of the decision made by the second policy decision service, wherein the decision made by the second policy decision service is based on an evaluation of one or more third-party-associated authorization policies against attribute information associated with one or more of:
the user;
the user's client device; and
the environment.

17. The method of claim 16, wherein making the login request decision permitting or denying the user access to the restricted resource comprises making a permit decision when:
the first authorization access response indicates that the third-party subscriber is allowed access to the restricted resources and that the third-party subscriber is an authorized broker of the restricted resources to users affiliated with the third-party subscriber; and
the second authorization access response indicates that the user is allowed access to the restricted resources.

18. The method of claim 16, wherein evaluating one or more third-party-associated authorization policies against attribute information associated with one or more of the user, the user's client device, and the environment comprises:
evaluating attribute information stored in a user attribute store associated with the third-party subscriber for determining a status of at least one of:
the user's student status;
the user's housing status;
the user's grade point average status; and
the user's student category; and
evaluating attribute information included in the login request for determining at least one of:
the client device's network connection status;
the client device's location status;
date of the request; and
time of the request.

19. The method of claim 14, wherein evaluating one or more third-party-associated authorization policies against attribute information associated with one or more of the user, the user's client device, and the environment comprises evaluating attribute information included in the login request for determining at least one of:
the client device's network connection status;
the client device's location status;
date of the request; and
time of the request.

20. A computer readable storage device that includes executable instructions which, when executed by a processor use a policy enforcement service as part of:
receiving a request from a user device of a user to access a restricted resource associated with a restricted resource provider, wherein the user is not subscribed to the restricted resource provider but affiliated with a third-party subscriber;
in response to receipt of the request to access the restricted resource associated with the restricted resource provider from the user device, begin a multi-party authentication process that includes:
transmitting an authentication request to an authentication provider associated with the third-party subscriber that includes a call to a directory services database to authenticate that the user is affiliated with the third-party subscriber, wherein the authentication request includes user login credentials associated with a user account with the third-party subscriber;
responsive to receiving an indication from the authentication provider that the authentication request is approved, sending a first authorization access request associated with the third-party subscriber to a first policy decision service managed by an authorized resource distributor to provide access to the restricted resource;
receiving, from the first policy decision service managed by the authorized resource distributor, a first response that indicates whether the third-party subscriber is authorized to access the restricted resource identified in the request to access the restricted resource from the user device and authorized to distribute the restricted resource to authorized users of a network provided by the third-party subscriber; and
sending a second authorization access request to a second policy decision service associated with the third-party subscriber;
receiving, from the second policy decision service, a second response comprising a decision made by the second policy decision service indicating whether the user is allowed access to the restricted resources; and
granting permission to the user device to access the restricted resource via the authorized resource distributor when the third-party subscriber is authorized to access and distribute the restricted resource according to the decisions of the first policy decision service and the second policy decision service.

* * * * *